(12) United States Patent
Smith et al.

(10) Patent No.: US 6,360,097 B1
(45) Date of Patent: Mar. 19, 2002

(54) METHOD AND APPARATUS IN A WIRELESS COMMUNICATION UNIT FOR CONTROLLING A RATE OF BACKGROUND SCANNING

(75) Inventors: Brian Keith Smith, North Richland Hills; Steven Wayne Whisenhunt, Fort Worth, both of TX (US)

(73) Assignee: Motorola, Inc., Schaumburg, IL (US)

( * ) Notice: Subject to any disclaimer, the term of this patent is extended or adjusted under 35 U.S.C. 154(b) by 12 days.

(21) Appl. No.: 09/639,433

(22) Filed: Aug. 14, 2000

(51) Int. Cl.[7] .............................. H04Q 7/80; H04B 1/38

(52) U.S. Cl. ...................... 455/434; 455/574; 455/38.3; 455/343; 455/135

(58) Field of Search .................................. 455/434, 435, 455/450, 455, 458, 161.1–161.3, 67.1, 67.3, 38.3, 574, 277.2, 133, 134, 135, 343, 515–517; 370/329, 333, 332

(56) References Cited

U.S. PATENT DOCUMENTS

| | | | | |
|---|---|---|---|---|
| 5,539,748 A | * | 7/1996 | Raith | 455/38.3 |
| 5,682,147 A | | 10/1997 | Eaton et al. | 340/825.03 |
| 6,067,460 A | * | 5/2000 | Alanara et al. | 455/574 |
| 6,185,423 B1 | * | 2/2001 | Brown et al. | 455/434 |
| 6,292,660 B1 | * | 9/2001 | Hartless et al. | 455/434 |

* cited by examiner

Primary Examiner—Nguyen T. Vo
Assistant Examiner—Duc Nguyen
(74) Attorney, Agent, or Firm—R. Louis Breeden

(57) ABSTRACT

A processor (206) and a receiver (202) monitor (301) a channel. The processor determines (304, 306) an average received signal quality on the channel and a first derivative of the average received signal quality. The processor then adjusts (308–336) the rate of background scanning to a value determined from an absolute value of the first derivative when the first derivative is positive and the average received signal quality is less than an acquisition threshold, and when the first derivative is negative and the average received signal quality is greater than the acquisition threshold.

18 Claims, 3 Drawing Sheets

METHOD AND APPARATUS IN A WIRELESS COMMUNICATION UNIT FOR CONTROLLING A RATE OF BACKGROUND SCANNING

FIELD OF THE INVENTION

This invention relates in general to wireless communication systems, and more specifically to a method and apparatus in a wireless communication unit for controlling a rate of background scanning.

BACKGROUND OF THE INVENTION

A wireless communication unit must be able to perform background scanning for additional nearby channels which may be more appropriate (higher quality, higher priority, etc.) than a currently received channel. Prior-art wireless communication units either have utilized a fixed scan rate chosen to meet a desired battery life specification, or have utilized one of two different scan rates, the selection of which has been based on an average signal quality level of the channel.

In many situations, the prior art approaches have been inefficient, because a wireless communication unit can be in range of a desirable channel long before the wireless communication unit makes this determination. In some situations, considerable latency is introduced, causing the wireless communication unit to be slow in switching to an appropriate frequency or slow in registering with the system.

Thus what is needed is a method and apparatus in a wireless communication unit for controlling a rate of background scanning. The method and apparatus preferably will reduce latency as compared to prior art techniques, while still maintaining a desired battery life.

DETAILED DESCRIPTION OF THE DRAWINGS

Figure 1:
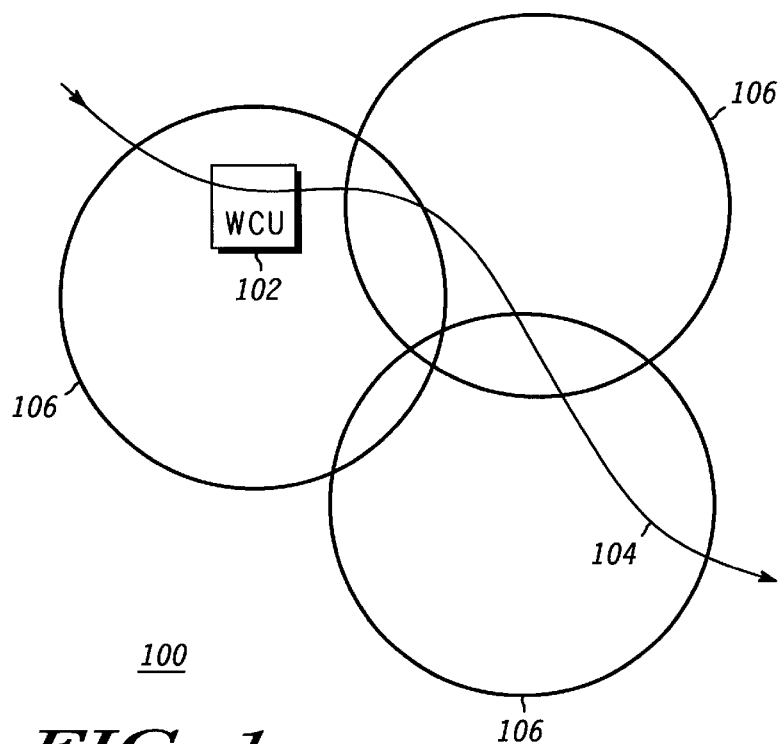
FIG. 1 is a coverage diagram of a multi-zone wireless system through which a wireless communication unit is moving.

Referring to FIG. 1, a coverage diagram 100 of a multi-zone wireless system through which a wireless communication unit 102 is moving depicts a path 104 traversed by the wireless communication unit 102, and three zones 106 through which the wireless communication unit 102 will pass. The three zones 106 transmit on three different channels, making it necessary for the wireless communication unit 102 to background scan to determine when it should switch to a different channel for optimum reception quality. If the wireless communication unit 102 is a two-way device, the wireless communication unit 102 also must register with each of the three zones 106 as the wireless communication unit 102 enters each zone.

In accordance with the present invention, the wireless communication unit 102 will calculate an average received signal quality, Qavg[n] and the first derivative of the average received signal quality, Q'avg[n]. The average received signal quality provides a measure of the ability of a device to acquire and maintain a channel. The first derivative of the average received signal quality indicates a short-term increase or decrease in the average channel quality which can trigger the wireless communication unit 102 to adjust the rate of background scanning.

A received signal quality, Q may be a calculated, for example, by using one of the following well-known techniques:
1. Bit Error Rate (BER) using the output of a decoder employing, for example, Bose-Chadhuri-Hocquenghem (BCH) or Reed-Solomon (RS) coding.
2. Codeword Error Rate (WER) using the output of a decoder employing, for example, BCH, RS, or Cyclic Redundancy Check (CRC) coding.
3. Received Signal Strength Indicator (RSSI) by measuring the strength of the received signal through well-known techniques.
4. Euclidean distance from the nearest ideal symbol value to the received symbol value.

It will be appreciated that, alternatively, other techniques can be utilized as well for determining received signal quality.

The average received signal quality is a moving average of the last $N_s$ samples of the received signal quality, which effectively removes any short-term fluctuations in the received signal quality. The wireless communication unit 102 periodically samples any potential alternate channel and updates the average received signal quality for each sampled channel. The average received signal quality is preferably calculated using the following equation:

$$Q_{avg}[n] = \frac{1}{N_s} \sum_{m=0}^{N_s-1} Q[n-m]$$

where $N_s$ is the number of samples in the average, m is the sample index, and n is the average received signal quality index.

The first derivative of the average received signal quality may be calculated by using the following equation;

$$Q'avg[n] = \frac{dQavg[n]}{dt} = \frac{(Qavg[n] - Qavg[n-1])}{T_s}$$

where Ts is the sampling time, which is the inverse of the scan rate, Rs.

For each new channel sample, the wireless communication unit 102 will calculate the received signal quality, Q, the average received signal quality, Qavg[n], and the first derivative of the average received signal quality, Q'avg[n]. The wireless communication unit 102 will adjust the scan rate in accordance with the first derivative of the average received signal quality and further in accordance with the average received signal quality relative to a channel acquisition threshold. The channel acquisition threshold, Qacq is the value of the average received signal quality at which the channel can be decoded with less than a predetermined error rate (e.g., 1% WER). Operation of the wireless communication unit 102 in accordance with the present invention will be described further herein below.

Figure 2:
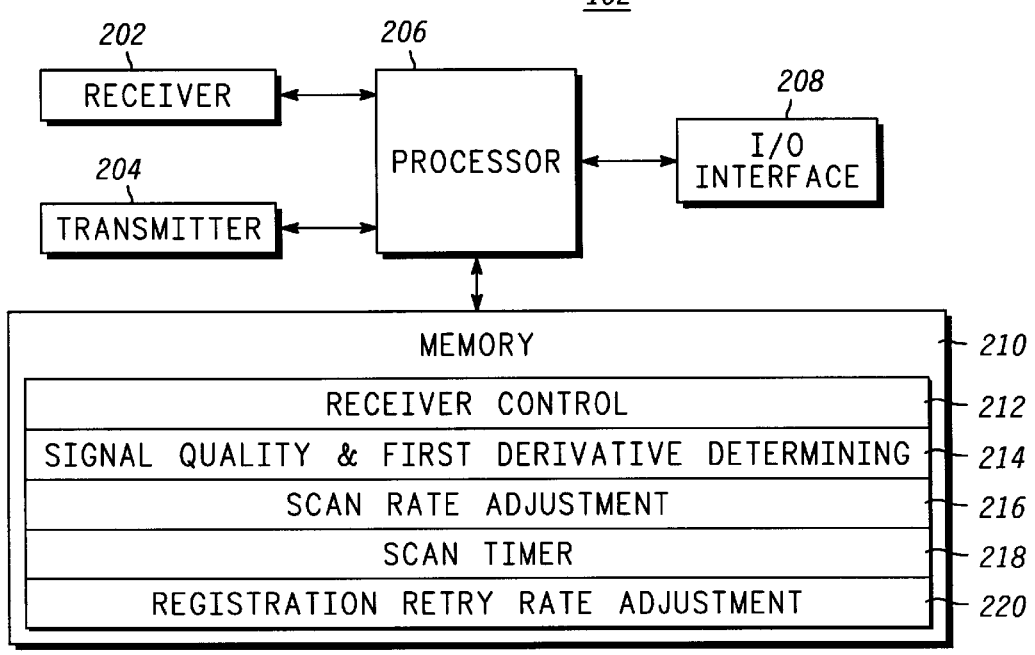
FIG. 2 is an electrical block diagram of the wireless communication unit in accordance with the present invention.

Referring to FIG. 2, an electrical block diagram depicts the wireless communication unit 102 in accordance with the present invention. The wireless communication unit 102 comprises a conventional receiver 202 for receiving a message and for monitoring a channel to perform background scanning. The background scanning of each channel monitored is performed at a rate determined in accordance with the present invention. The wireless communication unit 102 further comprises a conventional processor 206 coupled to the receiver 202 for controlling the receiver 202 and for cooperating with the receiver 202 to determine an average received signal quality on the channel and a first derivative of the average received signal quality. The processor 206 is further coupled to a conventional input/output interface 208, e.g., a display and keypad, for interfacing with a user. It will be appreciated that, alternatively, the input/output interface 208 can be a data interface for interchanging information with a machine. In one embodiment, the wireless communication unit 102 includes a transmitter 204 coupled to the processor 206 for transmitting information to a fixed portion of the wireless system and for registering therewith. It will be appreciated that in at least one embodiment the wireless communication unit 102 is powered by a conventional battery (not shown), and that long battery life is a highly desired feature of the wireless communication unit 102.

The wireless communication unit 102 further comprises a memory 210 coupled to the processor 206 for storing variables and software for programming the processor 206 in accordance with the present invention. The memory 210 includes a receiver control program 212 for programming the processor 206 to control the receiver 202 to monitor selected channels through well-known techniques. The memory 210 also includes a signal quality and first derivative determining program 214 for programming the processor 206 to determine an average received signal quality on a monitored channel and a first derivative of the average received signal quality, as described herein above. The memory 210 further comprises a scan rate adjustment program 216 for programming the processor 206 to adjust the background scanning rate to a value determined from an absolute value of the first derivative of the average received signal quality when the first derivative is positive and the average received signal quality is less than an acquisition threshold, and when the first derivative is negative and the average received signal quality is greater than the acquisition threshold. In addition, the memory 210 includes a scan timer program 218 for programming the processor 206 to time the duration of an increased background scanning rate and to adjust the scan rate to a predetermined lowest value when the scan timer expires. The memory 210 preferably also includes a registration retry rate adjustment program 220 for programming the processor 206 to check whether the wireless communication unit 102 is registered with a system using the channel; to determine whether the average received signal quality is greater than a first predetermined registration threshold and whether the first derivative is greater than a second predetermined registration threshold, when the wireless communication unit is not registered; and to cooperate with the transmitter to increase a registration retry rate of the wireless communication unit, in response to determining that the average received signal quality is greater than the first predetermined registration threshold and that the first derivative is greater than the second predetermined registration threshold.

Figure 3:
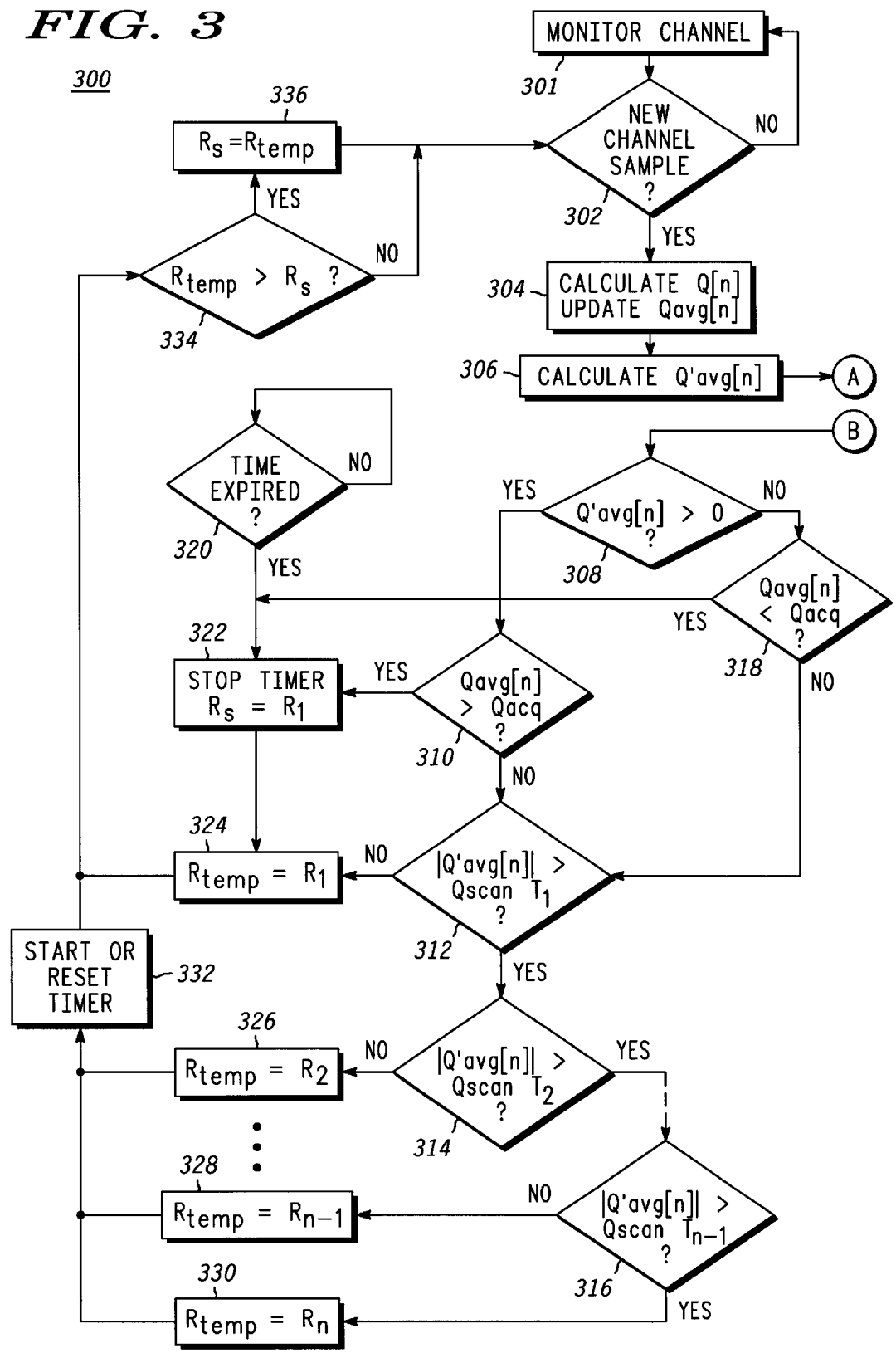
FIG. 3 is a flow diagram depicting a scan-rate-determining operation of the wireless communication unit in accordance with the present invention.
Figure 4:
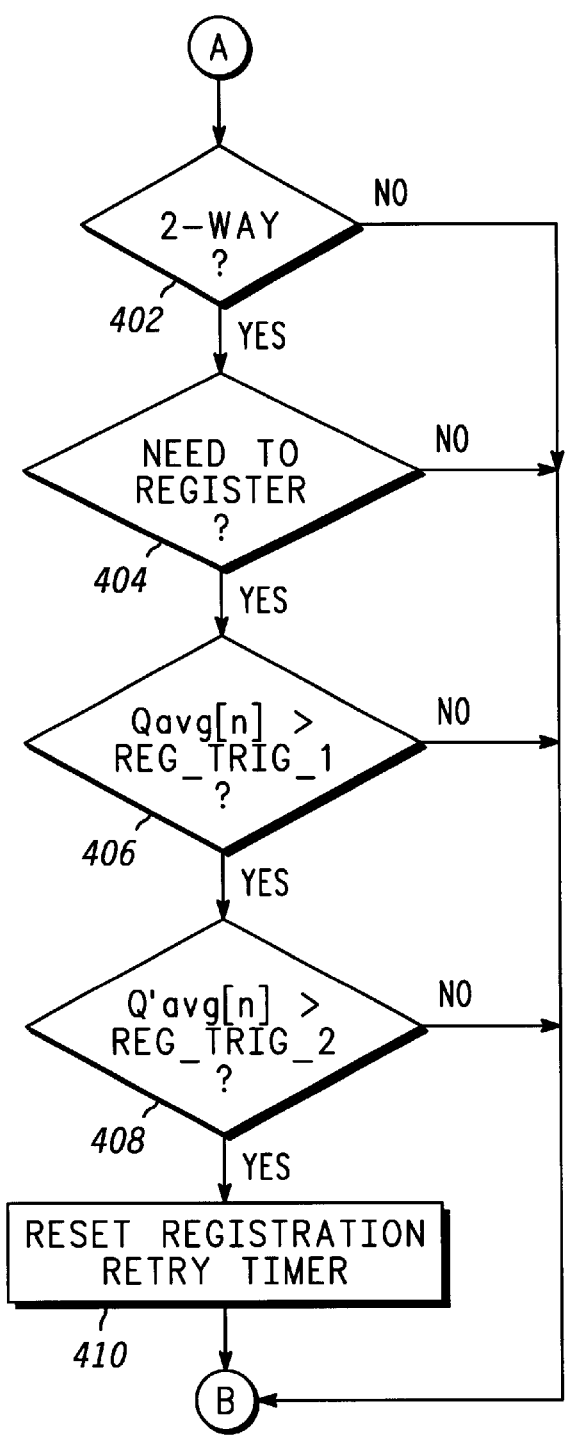
FIG. 4 is a flow diagram depicting a retry-timer-resetting operation of the wireless communication unit in accordance with the present invention.

Referring to FIGS. 3 and 4, flow diagrams 300 and 400 depict, respectively, a scan-rate-determining operation and a retry-timer-resetting operation of the wireless communication unit 102 in accordance with the present invention. In FIG. 3, the flow begins with the processor 206 cooperating with the receiver 202 to monitor 301 a channel. When a new channel sample becomes available at step 302, the flow moves to step 304, where the processor 206 calculates the received signal quality Q[n] and updates the average received signal quality Qavg[n] according the corresponding equation disclosed herein above. The processor 206 then calculates 306 the first derivative of the average received signal quality according to the corresponding equation also disclosed herein above. The flow then proceeds to step 402 (FIG. 4), where the processor 206 checks whether the wireless communication unit 102 is a two-way device. If so, the processor 206 checks 404 whether the wireless communication unit 102 needs to register with the system utilizing the channel, i.e., whether the wireless communication unit has not yet registered with the system. If so, the processor 206 preferably checks 406 whether the average received signal quality is greater than a first registration trigger. If so, the processor 206 preferably checks 408 whether the first derivative of the average received signal quality is greater than a second registration trigger. If so the processor 206 cooperates with the transmitter 204 to reset 410 the registration retry timer, thereby increasing a registration retry rate of the wireless communication unit 102. The flow then proceeds to step 308 (FIG. 3). If, on the other hand, a negative result is returned at any of steps 402 through 408, then the flow returns immediately to step 308. It will be appreciated that, alternatively, one of the steps 406, 408 can be omitted.

At step 308, the processor 206 checks whether the first derivative of the average received signal quality is positive. If so, the processor 206 checks 310 whether the average received signal quality is greater than the channel acquisition threshold. If so, the processor 206 stops 322 the scan timer (if running) and sets the current background scanning rate $R_s$ equal to $R_1$, the lowest scan rate value, thereby advantageously reducing power consumption of the wireless communication unit 102. It will be appreciated that step 322 also is entered to stop the scan timer whenever the scan timer has expired in step 320. A temporary scan rate value $R_{temp}$ is also set 324 to $R_1$, the lowest scan rate value. Flow then moves to step 334 where the processor 206 checks whether the temporary scan rate value $R_{temp}$ is greater than the current scan rate $R_s$. If so, the processor 206 sets 336 the current scan rate to the temporary scan rate. Flow then proceeds to step 302 to await a next channel sample. If, on the other hand, at step 334 the temporary scan rate is not greater than the current scan rate, the flow proceeds directly to step 302.

If, on the other hand, at step 310 the average received signal quality is not greater than the channel acquisition threshold, the processor 206 then checks 312 whether the absolute value of the first derivative of the average received signal quality is greater than a first scan threshold. If not, the flow returns to step 324. If so, the processor 206 checks 314 whether the absolute value of the first derivative of the average received signal quality is greater than a second scan threshold. If not, the processor 206 sets 326 the temporary scan rate value to a second value $R_2$, higher than $R_1$. The flow then moves to step 332, where the processor 206 starts (if the scan timer is not running) or resets (if the scan timer is running) the scan timer. If, on the other hand, at step 314 the result is positive, the processor 206 checks 316 whether the absolute value of the first derivative of the average received signal quality is greater than a third scan threshold. If not, the processor 206 sets 328 the temporary scan rate value to a third value $R_{n-1}$, higher than $R_2$, and the flow moves to step 332. If, on the other hand, at step 316 the result is positive, the processor 206 sets 330 the temporary scan rate value to a fourth value $R_n$, higher than $R_{n-1}$, and the flow moves to step 332. It will be appreciated that, alternatively, the total number of scan thresholds and the total number of corresponding values to which the temporary scan rate value can be set can be higher or lower than three and four, respectively, depending upon design choice.

If, on the other hand, at step 308 the first derivative of the average received signal quality is not positive, then the processor 206 checks 318 whether the average received signal quality is less than the channel acquisition threshold. If so, the flow proceeds to step 322 to stop the scan timer and set the current background scanning rate $R_s$ equal to $R_1$, the lowest scan rate value, thereby advantageously reducing power consumption or the wireless communication unit 102. If not, the flow proceeds to step 312 to check whether the absolute value of the first derivative of the average received signal quality is greater than a first scan threshold, and to proceed accordingly, as described herein above.

Simulations have determined that considerable performance improvement results from utilizing the present invention in the wireless communication unit 102. For example, during simulations of both a linearly increasing average received signal quality and a stepped increase in average received signal quality, the latency of detecting the simulated new zone was reduced by a factor of approximately two, compared with the prior-art background scanning technique. In addition, simulations of battery life have demonstrated that the present invention provides a substantial increase in battery life, e.g., an increase of more than 14 days for a personal collapse value of four, with the FLEX™ family of protocols.

It should be clear from the preceding disclosure that the present invention provides a method and apparatus for controlling a rate of background scanning. The method and apparatus advantageously reduces latency as compared to prior art techniques, while also improving battery life.

Many modifications and variations of the present invention are possible in light of the above teachings. Thus, it is to be understood that, within the scope of the appended claims, the invention can be practiced other than as specifically described herein above.

What is claimed is:

1. A method in a wireless communication unit for controlling a rate of background scanning, comprising the steps of:
    monitoring a channel;
    determining an average received signal quality on the channel and a first derivative of the average received signal quality; and
    adjusting said rate to a value determined from an absolute value of said first derivative when said first derivative is positive and said average received signal quality is less than an acquisition threshold, and when said first derivative is negative and said average received signal quality is greater than the acquisition threshold.

2. The method of claim 1, wherein the step of adjusting said rate comprises the step of
    adjusting said rate to a predetermined lowest value when said first derivative is positive, and said average received signal quality is greater than said acquisition threshold.

3. The method of claim 1, wherein the step of adjusting said rate comprises the step of
    adjusting said rate to a predetermined lowest value when said first derivative is not positive, and said average received signal quality is less than said acquisition threshold.

4. The method of claim 1, wherein the step of adjusting said rate comprises the step of
    leaving said rate at a predetermined lowest value when the absolute value of said first derivative is less than a predetermined amount.

5. The method of claim 1, wherein the step of adjusting said rate comprises the steps of:
    activating a scan timer after increasing said rate; and
    adjusting said rate to a predetermined lowest value when said scan timer expires.

6. The method of claim 1, wherein the step of adjusting said rate comprises the step of
    adjusting said rate separately for each of a plurality of channels scanned by the wireless communication unit.

7. The method of claim 1,
    wherein the wireless communication unit is a two-way unit, and
    wherein the method comprises the steps of:
        checking whether the wireless communication unit is registered with a system using the channel;
        determining whether said first derivative is greater than a predetermined registration threshold, when the wireless communication unit is not registered; and
        increasing a registration retry rate of the wireless communication unit, in response to determining that said first derivative is greater than the predetermined registration threshold.

8. The method of claim 1,
    wherein the wireless communication unit is a two-way unit, and
    wherein the method comprises the steps of:
        checking whether the wireless communication unit is registered with a system using the channel;
        determining whether said average received signal quality is greater than a predetermined registration threshold, when the wireless communication unit is not registered; and
        increasing a registration retry rate of the wireless communication unit, in response to determining that said average received signal quality is greater than the predetermined registration threshold.

9. The method of claim 1,
    wherein the wireless communication unit is a two-way unit, and
    wherein the method comprises the steps of:
        checking whether the wireless communication unit is registered with a system using the channel;
        determining whether said average received signal quality is greater than a first predetermined registration threshold and whether said first derivative is greater than a second predetermined registration threshold, when the wireless communication unit is not registered; and
        increasing a registration retry rate of the wireless communication unit, in response to determining that said average received signal quality is greater than the first predetermined registration threshold and that said first derivative is greater than the second predetermined registration threshold.

10. A wireless communication unit for controlling a rate of background scanning, comprising:
    a receiver for monitoring a channel; and
    a processor coupled to the receiver for controlling the receiver and for cooperating with the receiver to determine an average received signal quality on the channel and a first derivative of the average received signal quality, wherein the processor is programmed to adjust said rate to a value determined from an absolute value of said first derivative when said first derivative is positive and said average received signal quality is less than an acquisition threshold, and when said first derivative is negative and said average received signal quality is greater than the acquisition threshold.

11. The wireless communication unit of claim 10, wherein the processor is further programmed to adjust said rate to a predetermined lowest value when said first derivative is positive, and said average received signal quality is greater than said acquisition threshold.

12. The wireless communication unit of claim 10, wherein the processor is further programmed to adjust said rate to a predetermined lowest value when said first derivative is not positive, and said average received signal quality is less than said acquisition threshold.

13. The wireless communication unit of claim 10, wherein the processor is further programmed to leave said rate at a predetermined lowest value when the absolute value of said first derivative is less than a predetermined amount.

14. The wireless communication unit of claim 10, wherein the processor is further programmed to:

activate a scan timer after increasing said rate; and adjust said rate to a predetermined lowest value when said scan timer expires.

15. The wireless communication unit of claim 10, wherein the processor is further programmed to adjust said rate separately for each of a plurality of channels scanned by the wireless communication unit.

16. The wireless communication unit of claim 10, wherein the wireless communication unit further comprises a transmitter coupled to the processor for transmitting a message, and wherein the processor is further programmed to:

check whether the wireless communication unit is registered with a system using the channel;

determine whether said first derivative is greater than a predetermined registration threshold, when the wireless communication unit is not registered; and cooperate with the transmitter to increase a registration retry rate of the wireless communication unit, in response to determining that said first derivative is greater than the predetermined registration threshold.

17. The wireless communication unit of claim 10, wherein the wireless communication unit further comprises a transmitter coupled to the processor for transmitting a message, and wherein the processor is further programmed to:

check whether the wireless communication unit is registered with a system using the channel;

determine whether said average received signal quality is greater than a predetermined registration threshold, when the wireless communication unit is not registered; and cooperate with the transmitter to increase a registration retry rate of the wireless communication unit, in response to determining that said average received signal quality is greater than the predetermined registration threshold.

18. The wireless communication unit of claim 10, wherein the wireless communication unit further comprises a transmitter coupled to the processor for transmitting a message, and wherein the processor is further programmed to:

check whether the wireless communication unit is registered with a system using the channel;

determine whether said average received signal quality is greater than a first predetermined registration threshold and whether said first derivative is greater than a second predetermined registration threshold, when the wireless communication unit is not registered; and cooperate with the transmitter to increase a registration retry rate of the wireless communication unit, in response to determining that said average received signal quality is greater than the first predetermined registration threshold and that said first derivative is greater than the second predetermined registration threshold.

* * * * *